US 12,085,036 B2

(12) United States Patent
Ito et al.

(10) Patent No.: US 12,085,036 B2
(45) Date of Patent: Sep. 10, 2024

(54) ENGINE CONTROL APPARATUS

(71) Applicant: SUBARU CORPORATION, Tokyo (JP)

(72) Inventors: Gaku Ito, Tokyo (JP); Yoshifumi Yamazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/368,956

(22) Filed: Sep. 15, 2023

(65) Prior Publication Data
US 2024/0102429 A1 Mar. 28, 2024

(30) Foreign Application Priority Data
Sep. 27, 2022 (JP) ................................ 2022-154236

(51) Int. Cl.
*F02D 41/40* (2006.01)
*F02P 5/15* (2006.01)
*F02D 41/38* (2006.01)

(52) U.S. Cl.
CPC .......... *F02D 41/401* (2013.01); *F02P 5/1512* (2013.01); *F02D 2041/389* (2013.01)

(58) Field of Classification Search
CPC . F02D 41/401; F02D 2041/389; F02P 5/1512
See application file for complete search history.

(56) References Cited

U.S. PATENT DOCUMENTS

| | | | | |
|---|---|---|---|---|
| 2,285,107 A | * | 6/1942 | Bohli | F02P 15/08 310/70 R |
| 6,032,637 A | * | 3/2000 | Mamiya | F02D 41/2409 123/295 |
| 6,085,733 A | * | 7/2000 | Motoyama | F02P 15/10 123/636 |
| 6,397,827 B1 | * | 6/2002 | Kato | F02P 9/007 123/638 |

(Continued)

FOREIGN PATENT DOCUMENTS

| | | |
|---|---|---|
| JP | 2002-227706 A | 8/2002 |
| JP | 2009-121255 A | 6/2009 |

(Continued)

*Primary Examiner* — Carl C Staubach
(74) *Attorney, Agent, or Firm* — TROUTMAN PEPPER HAMILTON SANDERS LLP

(57) ABSTRACT

An engine control apparatus includes a control system including one or more memories and one or more processors communicably coupled to one another, and controlling ignition timing of a spark plug. The one or more memories hold first and second ignition timing maps that provide setting of the ignition timing for each engine operation point. The one or more processors determine the number of injection stages of an injector. When the number of injection stages of the injector is the first number of injection stages, the one or more processors control the ignition timing of the spark plug based on the first ignition timing map. When the number of injection stages of the injector is the second number of injection stages greater than the first number of injection stages, the one or more processors control the ignition timing of the spark plug based on the second ignition timing map.

1 Claim, 10 Drawing Sheets

(56) References Cited

U.S. PATENT DOCUMENTS

| | | | |
|---|---|---|---|
| 6,694,959 B1 * | 2/2004 | Miwa | F02P 15/08 |
| | | | 123/636 |
| 7,747,379 B2 * | 6/2010 | Kita | F02D 37/02 |
| | | | 123/406.47 |
| 2002/0100453 A1 | 8/2002 | Idogawa et al. | |
| 2007/0012289 A1 * | 1/2007 | Yamaguchi | F02D 37/02 |
| | | | 123/406.47 |
| 2009/0125212 A1 * | 5/2009 | Kurashima | F02D 41/0002 |
| | | | 701/103 |
| 2014/0123935 A1 * | 5/2014 | Imaoka | F02D 41/402 |
| | | | 123/295 |
| 2017/0356351 A1 | 12/2017 | Kawai et al. | |

FOREIGN PATENT DOCUMENTS

| | | |
|---|---|---|
| JP | 2016-53322 A | 4/2016 |
| JP | 2016-121539 A | 7/2016 |

\* cited by examiner

MAP OF THE NUMBER OF INJECTION STAGES FOR LOW WATER TEMPERATURES

IGNITION TIMING MAP FOR THREE-STAGE INJECTION

ENGINE CONTROL APPARATUS

CROSS-REFERENCE TO RELATED APPLICATIONS

The present application claims priority from Japanese Patent Application No. 2022-154236 filed on Sep. 27, 2022, the entire contents of which are hereby incorporated by reference.

BACKGROUND

The disclosure relates to an engine control apparatus that controls an engine.

There has been known a gasoline direct injection engine that makes multi-stage fuel injection into a combustion chamber, to enhance a compression ratio by lowering a temperature in the combustion chamber by latent heat of vaporization of the fuel. In this engine, the number of fuel injection stages is set in accordance with an engine operating point. The engine operating point is determined by an engine speed and an engine load. Moreover, in this engine, ignition timing to the fuel is set in accordance with the engine operating point. Thus, the ignition timing is controlled to become suitable for the number of injection stages. Japanese Unexamined Patent Application Publication (JP-A) Nos. 2002-227706, 2009-121255, 2016-121539, and 2016-053322 describe engine control apparatuses that shift ignition timing to an advance-angle side or a retard-angle side when switching the number of injection stages.

SUMMARY

An aspect of the disclosure provides an engine control apparatus configured to control an engine. The engine includes an injector and a spark plug. The injector is configured to inject fuel into a combustion chamber of the engine, and the spark plug is configured to ignite air-fuel mixture in the combustion chamber. The engine control apparatus includes a control system. The control system includes one or more memories and one or more processors communicably coupled to one another, and is configured to control ignition timing of the spark plug. The one or more memories are configured to hold a first ignition timing map and a second ignition timing map as timing maps that provide setting of the ignition timing for each engine operation point. The first ignition timing map corresponds to the first number of injection stages of the injector. The second ignition timing map corresponds to the second number of injection stages of the injector. The second number of ignition stages is greater than the first number of ignition stages. The one or more processors are configured to determine number of injection stages of the injector. When the number of injection stages of the injector is the first number of injection stages, the one or more processors are configured to control the ignition timing of the spark plug based on the first ignition timing map. When the number of injection stages of the injector is the second number of injection stages, the one or more processors are configured to control the ignition timing of the spark plug based on the second ignition timing map.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 10:
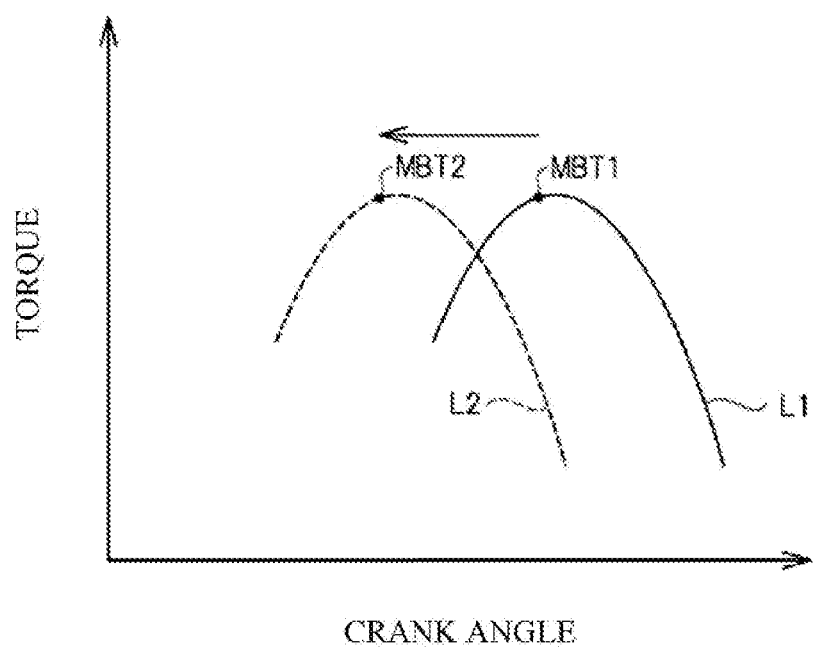
FIG. 10 illustrates relation between ignition timing and torque.

It has been found that when the number of injection stages is multi-staged in accordance with a state of an engine, e.g., a cooling water temperature, a minimum advance for the best torque (MBT) is shifted. FIG. 10 is a graph in which the vertical axis denotes torque and the horizontal axis denotes a crank angle. FIG. 10 illustrates relation between ignition timing and torque when theoretical air-fuel mixture is supplied at a constant accelerator position and a constant engine speed. In FIG. 10, the MBT for one-stage injection (L1) is an MBT1 advanced over the top dead center (TDC) of a piston. In contrast, in the case of multi-stage injection (L2), the MBT becomes an MBT2 more shifted to advance-angle side than the MBT1. In the case of the multi-stage injection, when ignition is carried out at the same timing as in the case of the one-stage injection, the ignition is retarded as viewed from ignition timing as the MBT2. This hinders suitable ignition timing.

It is desirable to provide an engine control apparatus that makes it possible to optimize ignition timing when the number of injection stages is multi-staged in accordance with a state of an engine.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
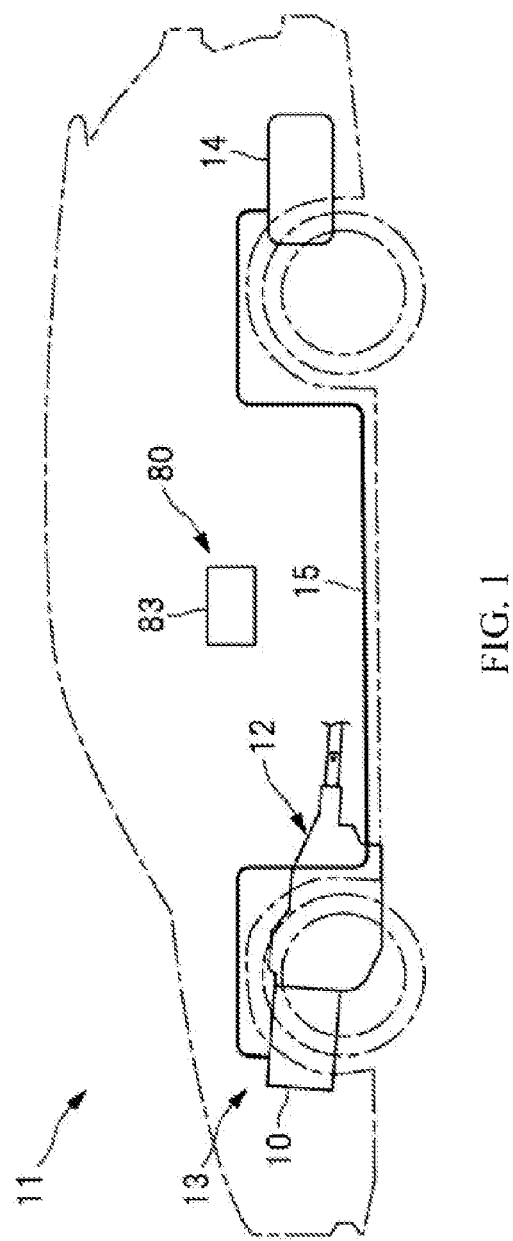
FIG. 1 illustrates an example of a vehicle on which an engine is mounted.

FIG. 1 illustrates an example of a vehicle 11 on which an engine 10 is mounted. As illustrated in FIG. 1, the vehicle 11 may include a power train 12 including the engine 10. The engine 10 may include a fuel injection device 13. The vehicle 11 may include a fuel tank 14 that stores fuel such as gasoline. The fuel tank 14 and the engine 10 may be coupled to each other through a fuel supply path 15. It is to be noted that the engine 10 in the figure includes a horizontal opposed engine, but this is non-limiting. The engine 10 may include an in-line engine or a V-type engine. Moreover, the engine 10 in the figure includes a four-cylinder engine, but this is non-limiting. The engine 10 may include an engine including five or more cylinders, or an engine including three or less cylinders inclusive of a one-cylinder engine.

Figure 2:
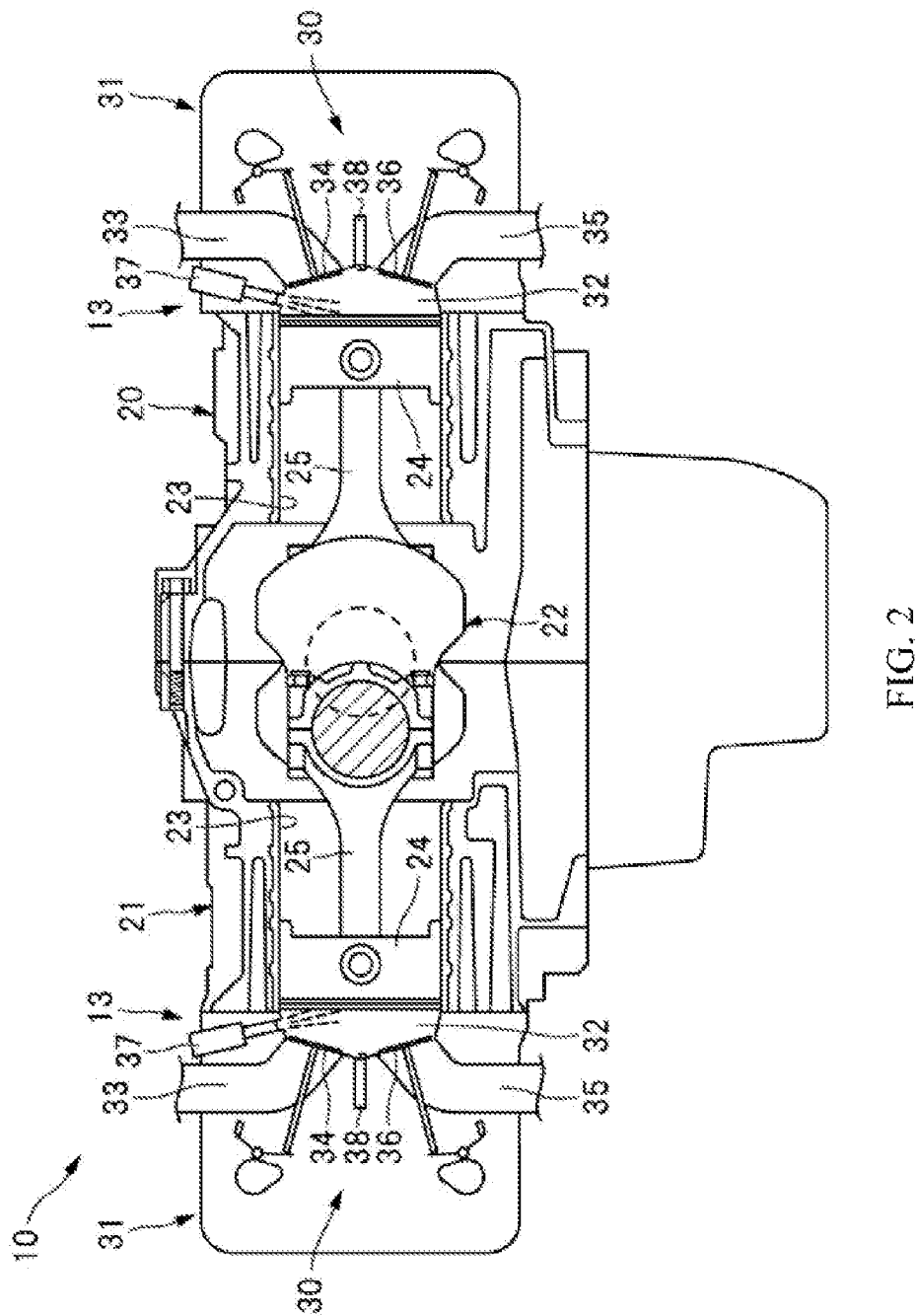
FIG. 2 illustrates an example of the engine.

FIG. 2 illustrates an example of the engine 10. As illustrated in FIG. 2, the engine 10 may include a cylinder block 20, a cylinder block 21, and a crankshaft 22. The cylinder block 20 is on one side of a cylinder bank. The cylinder block 21 is on the other side of the cylinder bank. The crankshaft 22 is supported by the pair of the cylinder blocks 20 and 21. Each of the cylinder blocks 20 and 21 includes a cylinder 23. Each of the cylinders 23 accommodates a piston 24. The crankshaft 22 and the piston 24 are coupled to each other through a connecting rod 25.

To each of the cylinder blocks 20 and 21, a cylinder head 31 is attached. The cylinder head 31 includes, for example, a valve mechanism 30. The cylinder head 31 includes a combustion chamber 32 for each of the cylinders 23. The cylinder head 31 further includes an intake port 33 and an intake valve 34. The intake port 33 communicates with the combustion chamber 32. The intake valve 34 is assembled with the cylinder head 31 and is configured to open and close the intake port 33. The cylinder head 31 also includes an exhaust port 35 and an exhaust valve 36. The exhaust port 35 communicates with the combustion chamber 32. The exhaust valve 36 is assembled with the cylinder head 31 and is configured to open and close the exhaust port 35. The cylinder head 31 further includes an injector 37 and a spark plug 38. The injector 37 is configured to inject fuel into the combustion chamber 32. The spark plug 38 is configured to ignite air-fuel mixture in the combustion chamber 32. The fuel tank 14 and the injector 37 are coupled to each other through the fuel supply path 15.

Figure 3:
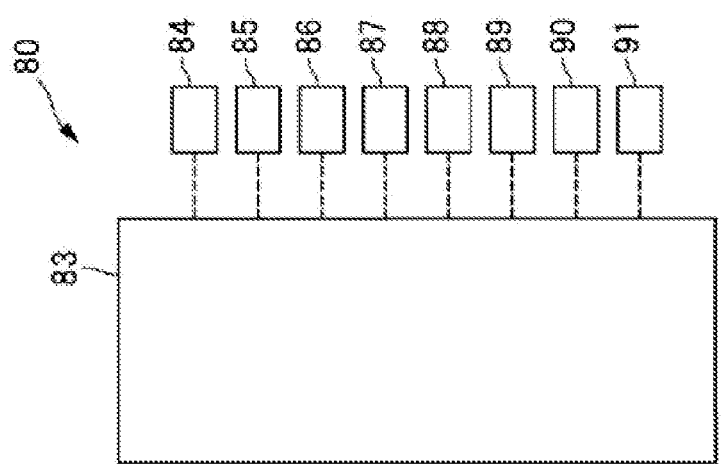
FIG. 3 is a block diagram of an example of a control system.

FIG. 3 illustrates an example of a control system 80. As illustrated in FIG. 3, the fuel injection device 13 includes the control system 80 including an engine control unit 83. Sensors are coupled to the engine control unit 83. Non-limiting examples of the sensors may include a vehicle speed sensor 84, an accelerator sensor 85, and a brake sensor 86. The vehicle speed sensor 84 may detect a vehicle speed. The accelerator sensor 85 may detect an amount of operation of an accelerator pedal. The brake sensor 86 may detect an amount of operation of a brake pedal. Other non-limiting examples of the sensors to be coupled to the engine control unit 83 may include a crank rotation sensor 87, a water temperature sensor 88, an airflow sensor 89, and an air-fuel ratio sensor 90. The crank rotation sensor 87 may detect a rotation angle of the crankshaft 22. The water temperature sensor 88 may detect a cooling water temperature of the engine 10. The airflow sensor 89 may detect an amount of intake air of the engine 10. The air-fuel ratio sensor 90 may detect an air-fuel ratio based on an oxygen concentration of an exhaust gas. Moreover, the engine control unit 83 may include a start switch 91. The start switch 91 may be manually operated at a start-up or a stop of the control system 80.

Figure 4:
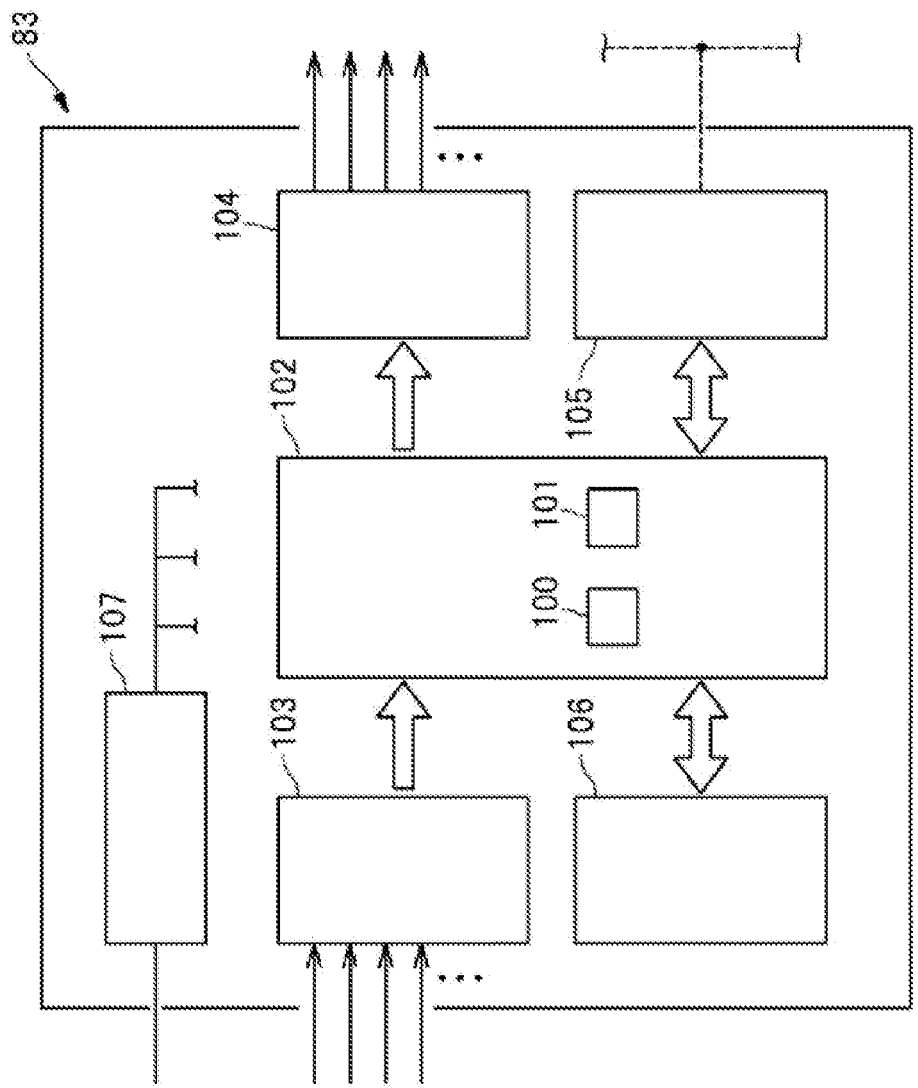
FIG. 4 illustrates an example of a basic configuration of an engine control unit.

FIG. 4 illustrates an example of a basic structure of the engine control unit 83. As illustrated in FIG. 4, the engine control unit 83 as an electronic control unit may include a microcontroller 102. In the microcontroller 102, for example, a processor 100 and a main memory 101 may be incorporated. In one embodiment of the disclosure, the processor 100 may serve as "one or more processors", and the main memory 101 may serve as "one or more memories". The main memory 101 may hold a predetermined program. The program is to be executed by the processor 100. The processor 100 and the main memory 101 are communicably coupled to each other. It is to be noted that multiple processors 100 may be incorporated in the microcontroller 102, and multiple main memories 101 may be incorporated in the microcontroller 102.

The engine control unit 83 may further include, for example, an input circuit 103, a drive circuit 104, a communication circuit 105, an external memory 106, and a power supply circuit 107. The input circuit 103 may convert signals inputted from various sensors into signals suppliable to the microcontroller 102. The drive circuit 104 may generate a drive signal for various devices such as the injector 37 and the spark plug 38 based on signals outputted from the microcontroller 102. The communication circuit 105 may convert the signals outputted from the microcontroller 102 into a communication signal directed to other electronic control units. The communication circuit 105 may also convert communication signals received from other electronic control units into signals suppliable to the microcontroller 102. The power supply circuit 107 may supply a stable power supply voltage to, for example, the microcontroller 102, the input circuit 103, the drive circuit 104, the communication circuit 105, and the external memory 106. The external memory 106 may include, for example, a nonvolatile memory. The external memory 106 may hold, for example, programs and various kinds of data.

The engine control apparatus according to this embodiment is configured to optimize ignition timing even when the number of injection stages is multi-staged in accordance with the state of the engine. Non-limiting examples of the state of the engine may include the cooling water temperature.

The background of this embodiment is as follows. The exhaust gas from the engine contains particulate matters (PM). Thus, it has been desired to reduce particulate number (PN) in the exhaust gas. In existing techniques, when the cooling water temperature of the engine is low, one-stage fuel injection is carried out. However, what is desired has been to multi-stage the number of injection stages to reduce the PN.

In existing control methods, however, when the number of injection stages is multi-staged to reduce the PN, the number of injection stages is switched based on the water temperature even if the engine operating point is the same. This hinders setting of the ignition timing in accordance with whether or not the number of injection stages is multi-staged. Moreover, in the existing control methods, it is difficult to synchronize timing of switching between the injection and the ignition. This possibly contributes to difficulties in providing appropriate ignition timing on several cycles immediately after the switching of the number of injection stages. Furthermore, as described in the beginning of this embodiment, the shift of the MBT retards the ignition timing, resulting in failure in providing suitable ignition timing.

Figure 5A:
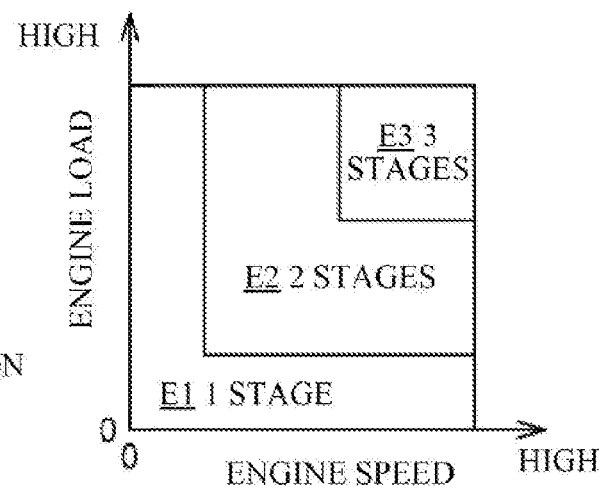
FIG. 5A illustrates an example of a map of the number of injection stages for normal operation.
Figure 5B:
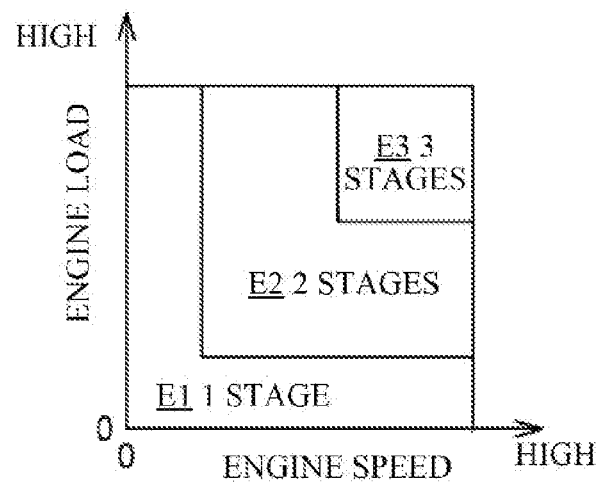
FIG. 5B illustrates an example of a map of the number of injection stages for low water temperatures.
Figure 6A:
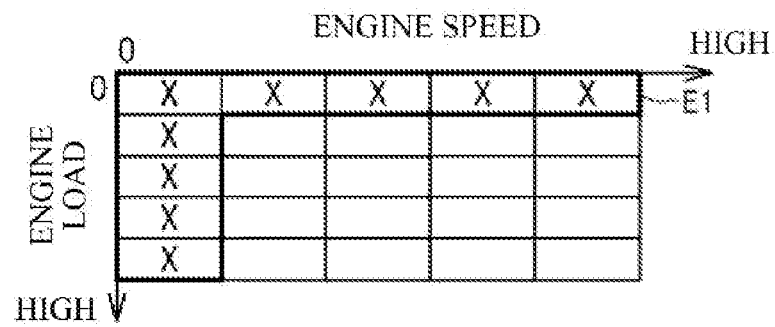
FIG. 6A illustrates an example of an ignition timing map for one-stage injection.
Figure 6B:
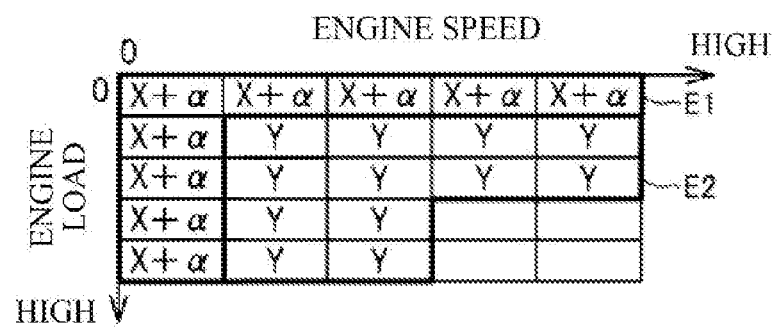
FIG. 6B illustrates an example of an ignition timing map for two-stage injection.
Figure 6C:
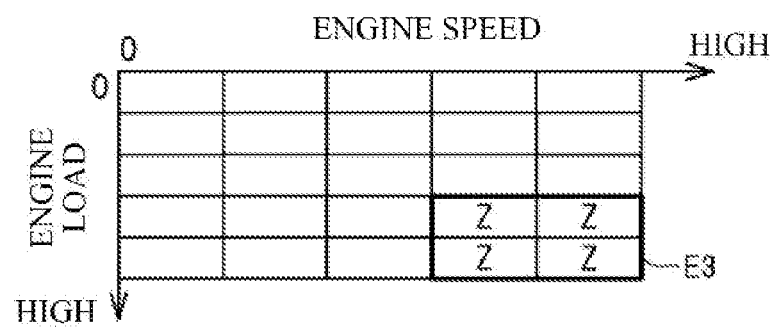
FIG. 6C illustrates an example of an ignition timing map for three-stage injection.

Thus, in the engine control apparatus according to this embodiment of the disclosure, aiming at a balance between the reduction in the PN and combustion stability by multi-staging the injection, the control system 80, e.g., the main memory 101, is configured to hold two kinds of maps of the number of injection stages corresponding to the cooling water temperature of the engine 10 in FIGS. 5A and 5B, and three kinds of ignition timing maps corresponding to the number of injection stages of the injector 37 in FIGS. 6A, 6B, and 6C. The control system 80, e.g., the processor 100, is configured to select one of these maps, i.e., switch between these maps, to make an ignition control in FIG. 7.

FIG. 5A illustrates an example of a map of the number of injection stages for normal operation. FIG. 5B illustrates an example of a map of the number of injection stages for low water temperatures. The map of the number of injection stages is a graph in which the vertical axis denotes an engine load and the horizontal axis denotes an engine speed. The number of injection stages of the injector 37 is determined for each engine operation point determined by the engine load and the engine speed. In the map of the number of injection stages, although not illustrated, an injection pulse width is also determined for each engine operation point. The injection pulse width represents time during which fuel injection is carried out.

FIG. 5A is a map to be selected after an end of warm-up operation. In other words, FIG. 5A is a map to be selected when the cooling water temperature of the engine 10 has become high. FIG. 5B is a map to be selected during the warm-up operation. In other words, FIG. 5B is a map to be selected when the cooling water temperature of the engine 10 is low. The cooling water temperature of the engine 10 may be detected by the water temperature sensor 88. The timing of switching between the maps may be set to any timing. In other words, a degree at which the maps are to be switched may be set to any value.

During normal operation, as illustrated in FIG. 5A, three-stage injection is carried out at each engine operation point in a region E3 in which the engine load is high and the engine speed is high. Two-stage injection is carried out at each engine operation point in a region E2 except for the region E3. The region E2 is a region where the engine load is medium or more and the engine speed is medium or more. One-stage injection is carried out at each engine operation point in a region E1 except for the regions E3 and E2. The region E1 includes a region where the engine load is low and the engine speed ranges from low to high, and a region where the engine speed is low and the engine load ranges from low to high.

In contrast, at low water temperatures, as illustrated in FIG. 5B, the three-stage injection is carried out in the region E3 and the two-stage injection is carried out in the region E2. However, in the region E1, the two-stage injection is carried out to balance the reduction in the PN and the combustion stability. That is, in comparison between FIGS. 5A and 5B, at low water temperatures, the number of injection stages is multi-staged in the region E1.

FIG. 6A illustrates an example of an ignition timing map for the one-stage injection. FIG. 6B illustrates an example of an ignition timing map for the two-stage injection. FIG. 6C illustrates an example of an ignition timing map for the three-stage injection. The ignition timing maps are each a table in which the vertical axis denotes the engine load and the horizontal axis denotes the engine speed. The ignition timing of the spark plug 38 is determined for each engine operation point determined based on the engine load and the engine speed. The ignition timing is represented in a degree of advance from the top dead center.

As illustrated in FIG. 6A, the ignition timing for the one-stage injection is set at $X°$. In one embodiment of the disclosure, the ignition timing map for the one-stage injection in FIG. 6A may serve as a "first ignition timing map" corresponding to the "first number of injection stages". As illustrated in FIG. 6C, the ignition timing for the three-stage injection is set at $Z°$.

As illustrated in FIG. 6B, the ignition timing for the two-stage injection may be set to $Y°$ with respect to the region E2. With respect to the region E1 in which the number of injection stages is multi-staged to the two-stage injection, the ignition timing may be set to the advance-angle side by $\alpha°$ from $X°$ in FIG. 6A. In one embodiment of the disclosure, the ignition timing map for the two-stage injection in FIG. 6B may serve as a "second ignition timing map" corresponding to the "second number of injection stages" greater than the "first number of injection stages". As described, in the second ignition timing map, the ignition timing in the region E1 in which the number of injection stages is multi-staged may be set to the advance-angle side with respect to the ignition timing in the first ignition timing map. This leads to optimal ignition timing.

Figure 7:
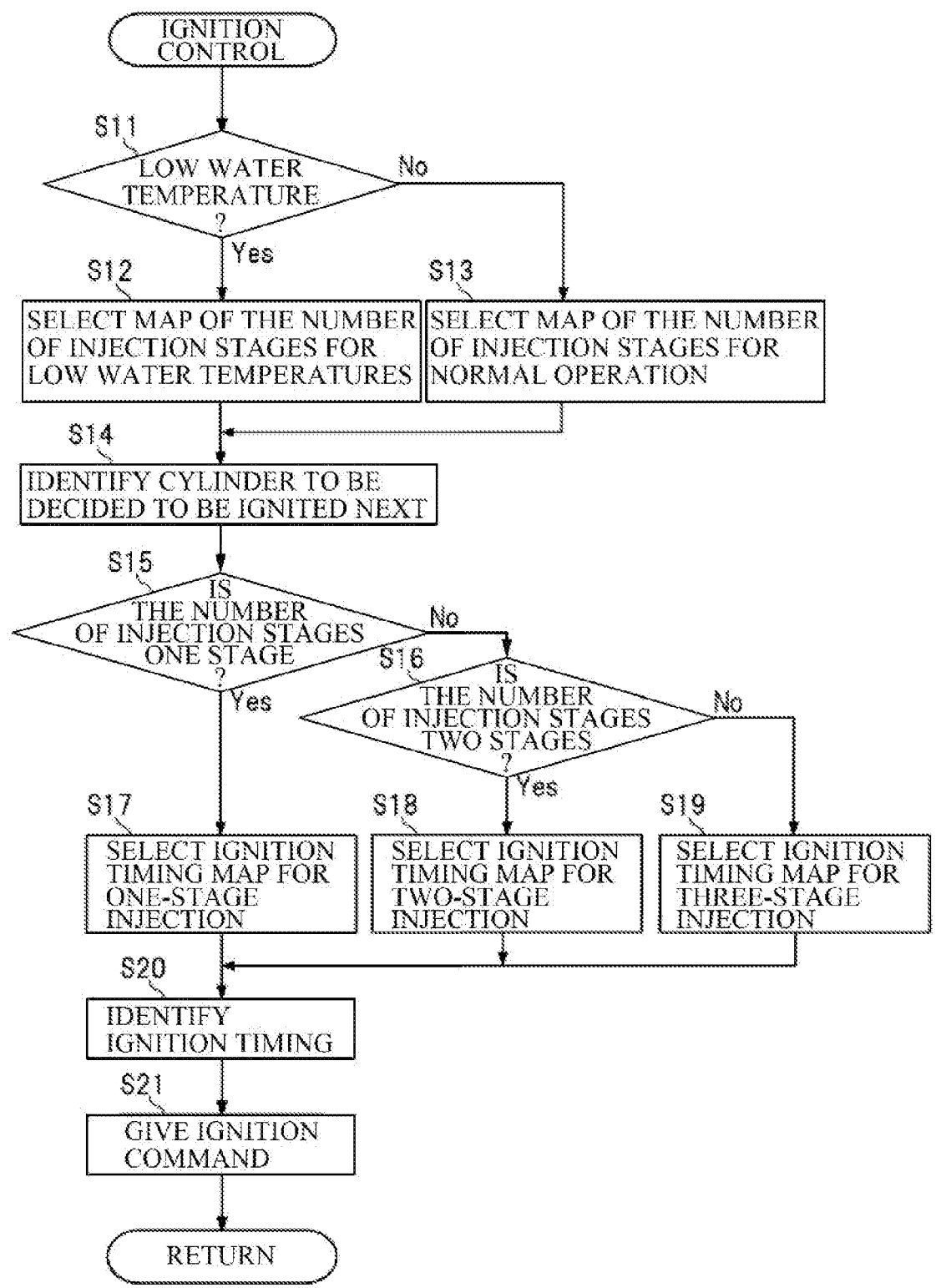
FIG. 7 is a flowchart illustrating an example of an ignition control.

FIG. 7 is a flowchart illustrating an example of the ignition control. Each step illustrated in the flowchart in FIG. 7 illustrates a process to be carried out by the processor 100 constituting the control system 80.

In step S11, the processor 100 may determine whether or not the cooling water temperature of the engine 10 is a low water temperature. In one example, the processor 100 may determine whether or not a detection result by the water temperature sensor 88 is equal to or lower than a predetermined water temperature. In step S11, when the processor 100 determines that the cooling water temperature of the engine 10 is a low water temperature (Yes), the processor 100 may select the map of the number of injection stages for low water temperatures in FIG. 5B as the map of the number of injection stages, and cause the flow to proceed to step S14. In step S11, when the processor 100 determines that the cooling water temperature of the engine 10 is not a low water temperature (No), the processor 100 may select the map of the number of injection stages for the normal operation in FIG. 5A as the map of the number of injection stages, and cause the flow to proceed to step S14.

Figure 8:
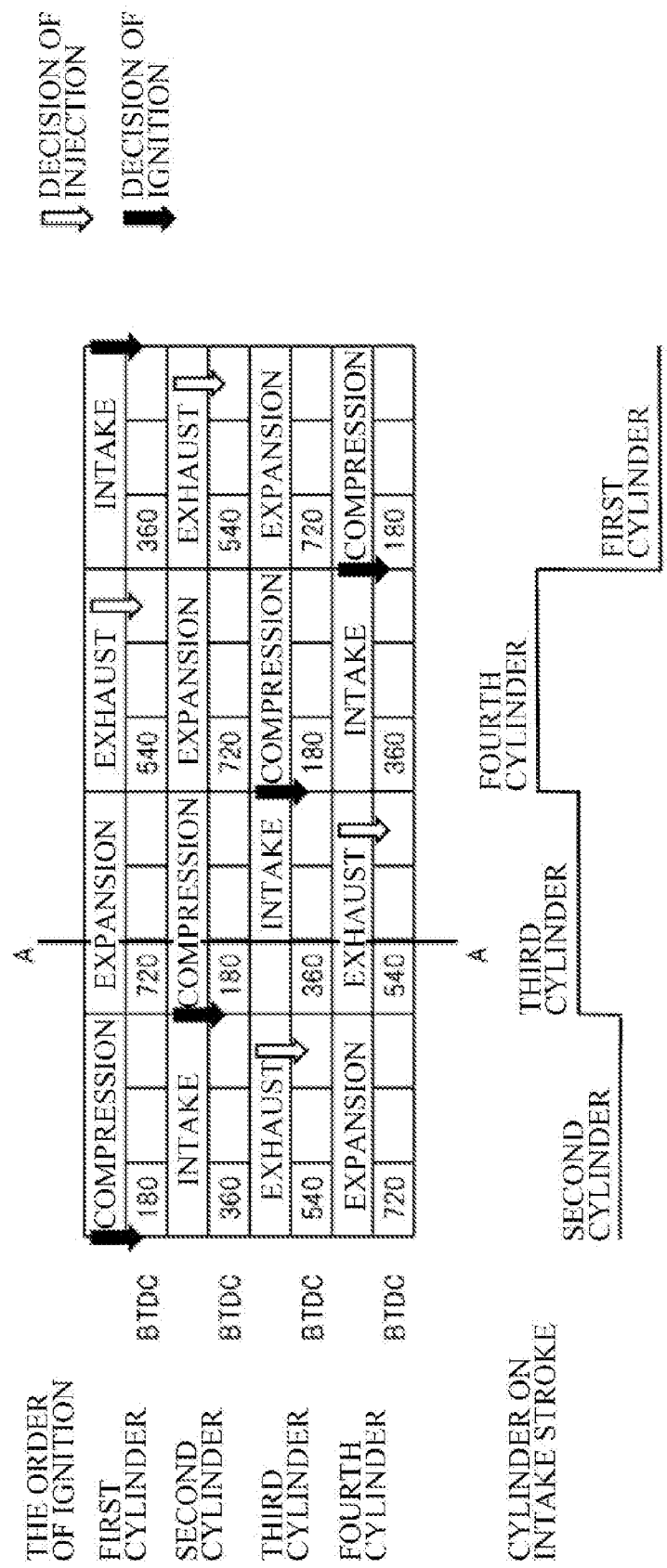
FIG. 8 illustrates relation between a crank angle and timing of decisions of injection and ignition for each cylinder.

In step S14, the processor 100 may identify a cylinder to be decided to be ignited next. FIG. 8 illustrates relation between a crank angle and timing of decisions of injection and ignition for each cylinder. In each of the four cylinders 23, i.e., first to fourth cylinders, as denoted by white arrows, injection by the injector 37 is decided in the middle of an exhaust stroke (BTDC 390°). As denoted by black arrows, ignition by the spark plug 38 is decided before a compressing stroke (BTDC 180°). Thus, it is possible to identify the cylinder to be decided to be ignited next, based on a detection result by the crank rotation sensor 87. For example, at timing denoted by a line A-A, the cylinder to be decided to be ignited next is the third cylinder. As described, with respect to the cylinder for which the injection has been decided, it is possible to decide the ignition timing corresponding to the number of injection stages.

In steps S15 and S16, the processor 100 may determine whether the number of injection stages of the cylinder identified in step S14 is one stage, whether the number of injection stages of the cylinder identified in step S14 is two stages, or whether the number of injection stages of the cylinder identified in step S14 is otherwise. In one example, the processor 100 may determine the number of injection stages, based on the injection pulse width set for each engine operation point, with the map of the number of injection stages selected in step S12 or S13.

In step S15, the processor 100 may determine whether or not the number of injection stages of the cylinder identified in step S14 is one stage. In step S15, when the processor 100 determines that the number of injection stages of the cylinder identified in step S14 is the one-stage injection (Yes), in step S17, the processor 100 may select the ignition timing map for the one-stage injection in FIG. 6A. In step S20, based on the ignition timing map for the one-stage injection, the processor 100 may identify the ignition timing at the current engine operation point. In step S21, the processor 100 may command the spark plug 38 to carry out the ignition at the identified ignition timing, and end the processing.

In step S15, when the processor 100 determines that the number of injection stages of the cylinder identified in step S14 is not the one-stage injection (No), in step S16, the processor 100 may determine whether or not the number of injection stages of the cylinder identified in step S14 is two stages. In step S16, when the processor 100 determines that the number of injection stages of the cylinder identified in step S14 is not the two-stage injection (No), in step S19, the processor 100 may select the ignition timing map for the three-stage injection in FIG. 6C. In step S20, based on the ignition timing map for the three-stage injection, the processor 100 may identify the ignition timing at the current engine operation point. In step S21, the processor 100 may command the spark plug 38 to carry out the ignition at the identified ignition timing, and end the processing.

In step S16, when the processor 100 determines that the number of injection stages of the cylinder identified in step S14 is the two-stage injection (Yes), in step S18, the processor 100 may select the ignition timing map for the two-stage injection in FIG. 6B. In step S20, based on the ignition timing map for the two-stage injection, the processor 100 may identify the ignition timing at the current engine operation point. In step S21, the processor 100 may command the spark plug 38 to carry out the ignition at the identified ignition timing, and end the processing. In the case of the two-stage injection, as illustrated in FIG. 6B, the ignition timing during the normal operation is Y° in the region E2, and the ignition timing at low water temperatures is advanced by α° from X° in the region E1.

As described, the control system 80 of this embodiment may determine the number of injection stages of the injector 37 (steps S15 and S16). When the number of injection stages is the "first number of injection stages", e.g., one stage, the control system 80 may control the ignition timing of the spark plug 38 based on the "first ignition timing map", e.g., the ignition timing map for the one-stage injection in FIG. 6A (steps S17, S20, and S21). When the number of injection stages is the "second number of injection stages", e.g., two stages, the control system 80 may control the ignition timing of the spark plug 38 based on the "second ignition timing map", e.g., the ignition timing map for the two-stage injection in FIG. 6B (steps S18 or S19, S20, and S21).

Thus, the ignition timing is controlled based on the ignition timing map corresponding to the number of injection stages. Hence, it is possible to optimize the ignition timing even when the number of injection stages is multi-staged in accordance with the state of the engine. Moreover, the ignition timing in the ignition timing map for the two-stage injection as the "second ignition timing map" may be set to the advance-angle side with respect to the ignition timing in the ignition timing map for the one-stage injection as the "first ignition timing map". Hence, it is possible to prevent the ignition timing from unintentionally retarded, and set suitable ignition timing. Furthermore, the number of injection stages of the injector 37 may be controlled in accordance with the cooling water temperature of the engine 10. Hence, it is possible to balance the reduction in the PN and the combustion stability. In addition, the number of injection stages may be determined for each of the multiple cylinders. Hence, it is possible to make the accurate control.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the forgoing embodiments, as illustrated in FIG. 5B, an example is described where the number of injection stages is multi-staged, i.e., changed from one stage to two stages, throughout the region E1. However, the number of injection stages may be multi-staged solely in a portion of the region E1.

In the forgoing embodiments, as illustrated in FIG. 5B, an example is described where the number of injection stages in the region E1 is multi-staged or changed from one stage to two stages. However, the number of injection stages may be multi-staged or changed to three stages.

In the forgoing embodiments, as illustrated in FIG. 6B, an example is described where the ignition timing in the region E1 is uniformly advanced by α° regardless of the engine operation point. However, the degree of the advance angle may be different for each engine operation point.

Figure 9A:
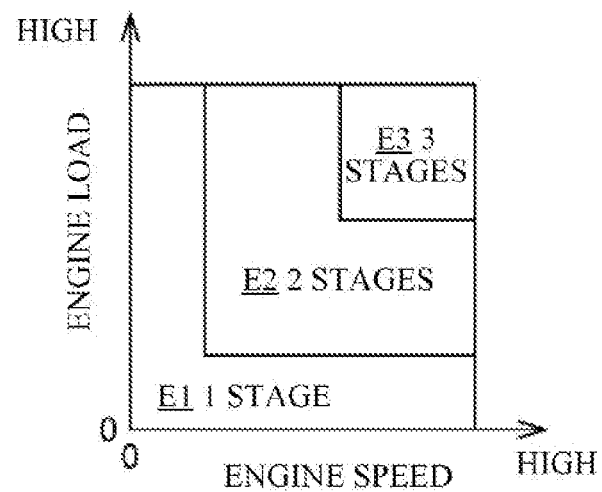
FIG. 9A illustrates a modification example of the map of the number of injection stages for low water temperatures.

In the forgoing embodiments, as illustrated in FIG. 6B, an example is described where at low water temperatures, the region E1 is shifted from the one-stage injection to the two-stage injection. However, as illustrated in FIG. 9A, the region E2 may also be shifted from the two-stage injection to the three-stage injection. FIG. 9A illustrates a modification example of the map of the number of injection stages for low water temperatures.

Figure 9B:
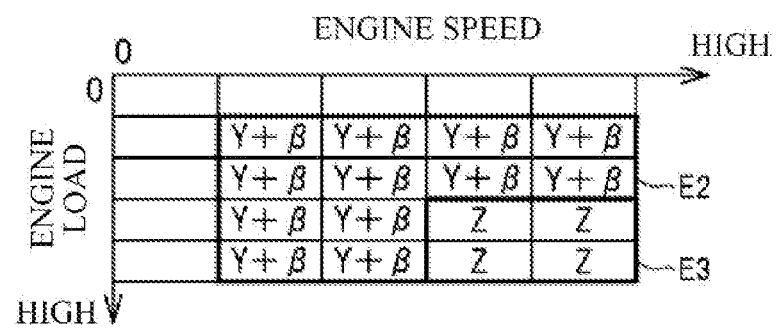
FIG. 9B illustrates a modification example of the ignition timing map for the three-stage injection.

In this case, as illustrated in FIG. 9B, the ignition timing in the region E2 is advanced by β° from X°. FIG. 9B illustrates a modification example of the ignition timing map for the three-stage injection. It should be noted that the ignition timing in the region E2 is not limited to the example where the ignition timing is uniformly advanced by β° regardless of the engine operation point. The degree of the advance angle may be different for each engine operation point.

In this case, the ignition timing map for the two-stage injection in FIG. 6B may serve the "first ignition timing map" corresponding to the "first number of injection stages", and the ignition timing map for the three-stage injection in FIG. 9B may serve as the "second ignition timing map" corresponding to the "second number of injection stages" greater than the "first number of injection stages".

In the forgoing embodiments, an example is described where the control of the number of injection stages in accordance with the state of the engine 10 is made in accordance with the cooling water temperature. However, the control may be performed according to other states, for example.

The engine control unit 83 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control unit 83. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control unit 83 illustrated in FIG. 3.

The invention claimed is:

1. An engine control apparatus configured to control an engine, the engine including an injector and a spark plug, the injector being configured to inject fuel into a combustion chamber of the engine, and the spark plug being configured to ignite air-fuel mixture in the combustion chamber, the engine control apparatus comprising:
  a control system comprising one or more memories and one or more processors communicably coupled to one another, and configured to control ignition timing of the spark plug,
  wherein the one or more memories is configured to hold a first map of a number of injection stages, a second map of the number of injection stages, a first ignition timing map and a second ignition timing map, the first map of the number of injection stages indicating a first relationship between an engine operation point of the engine and the number of injection stages of the injector, the second map of the number of injection stages indicating a second relationship, different from the first relationship, between the engine operation point and the number of injection stages, the first ignition timing map indicating a third relationship between the engine operation point and the ignition timing of the spark plug, the second ignition timing map indicating a fourth relationship, different from the third relationship, between the engine operation point and the ignition timing, the number of injection stages being indicated by an integer greater than or equal to 1, and
  wherein the one or more processors is configured to:
    determine whether a cooling water temperature of the engine is equal to or lower than a predetermined value;
    in response to determining that the cooling water temperature is equal to or lower than the predetermined value, during an exhaust stroke at a cylinder of the engine having the combustion chamber, determine the number of injection stages for next injection of the injector related to the cylinder based on the first map of the number of injection stages and a current engine operation point of the engine;
    in response to determining that the cooling water temperature is not equal to or lower than the predetermined value, during the exhaust stroke at the cylinder, determine the number of injection stages for the next injection of the injector based on the second map of the number of injection stages and the current engine operation point of the engine;
    in response to determination of the number of injection stages for the next injection, determine whether the number of injection stages for the next injection is 1;
    in response to determining that the number of injection stages for the next injection is 1, during an intake stroke following the exhaust stroke at the cylinder, determine the ignition timing of the spark plug based on the first ignition timing map and the current engine operation point;
    in response to determining that the number of injection stages for the next injection is not 1, during the intake stroke, determine the ignition timing of the spark plug based on the second ignition timing map and the current engine operation point; and
    in response to determination of the ignition timing, control next ignition timing of the spark plug based on the determined ignition timing,
  wherein when compared at a same engine operation point, the injection timing indicated by the second ignition timing map is set on an advance-angle side with respect to the injection timing indicated by the first ignition timing map.

* * * * *